March 24, 1964 E. H. LAND ETAL 3,125,938
CAMERA APPARATUS FOR EXPOSING AND PROCESSING PHOTOGRAPHIC FILM
Filed Aug. 8, 1962 4 Sheets-Sheet 1

Edwin H. Land
Richard J. Chen
John H. Lathrop
and
Richard R. Wareham
INVENTORS

BY Brown and Mikulka
ATTORNEYS

March 24, 1964 E. H. LAND ETAL 3,125,938
CAMERA APPARATUS FOR EXPOSING AND PROCESSING PHOTOGRAPHIC FILM
Filed Aug. 8, 1962 4 Sheets-Sheet 2

Edwin H. Land
Richard J. Chen
John H. Lothrop
and
Richard R. Wareham
INVENTORS

BY Brown and Mikulka

ATTORNEYS

March 24, 1964     E. H. LAND ETAL     3,125,938
CAMERA APPARATUS FOR EXPOSING AND PROCESSING PHOTOGRAPHIC FILM
Filed Aug. 8, 1962     4 Sheets-Sheet 3

BLACK-AND-WHITE FILM
(A.S.A. SPEED 3000)

|←— AUTOMATIC RANGE ——→|

| .4 | .8 | 1.56 | 3.12 | 6.25 | 12.5 | 25 | 50 | 100 | 200* | 400 | 800 | CANDLES / FT² |
|---|---|---|---|---|---|---|---|---|---|---|---|---|
| 10^Δ | 11 | 12 | 13 | 14 | 15 | 16 | 17 | 18 | 19 | 20 | 21 | EXPOSURE VALUE |
| 1/8 | 1/8 | 1/8 | 1/8 | 1/8 | 1/15 | 1/30 | 1/60 | 1/120 | 1/240 | 1/480 | 1/480 | SHUTTER SPEED |
| f/14 | f/16 | f/22 | f/32 |←—— f/45 ——→| | | | | | f/63 | | |

COLOR FILM
(A.S.A. SPEED 50 †)

| AUTOMATIC RANGE |

| 25 | 50 | 100 | 200* | 400 | 800 | CANDLES / FT² |
|---|---|---|---|---|---|---|
| 10^Δ | 11 | 12 | 13 | 14 | 15 | EXPOSURE VALUE |
| 1/8 | 1/8 | 1/15 | 1/30 | 1/60 | 1/120 | SHUTTER SPEED |
| f/14 |←—— f/16† ——→| | | | | |

*AVERAGE DAY

†IF A.S.A 100 SPEED FILM IS USED ON AN AVERAGE DAY OF 200 CANDLES/FT² EXPOSURE VALUE WOULD BE 14 AND APERTURE AT f/22 FOR AUTOMATIC RANGE WOULD BE INDICATED.

^Δ ACTUALLY BETWEEN 10 AND 11 BECAUSE f/14 IS NOT A FULL STOP.

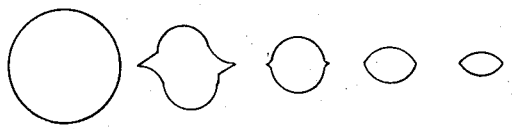

Edwin H. Land
Richard J. Chen
John H. Lothrop
and
Richard R. Wareham
INVENTORS

BY Brown and Mikulka
ATTORNEYS

March 24, 1964  E. H. LAND ETAL  3,125,938
CAMERA APPARATUS FOR EXPOSING AND PROCESSING PHOTOGRAPHIC FILM
Filed Aug. 8, 1962  4 Sheets-Sheet 4

Edwin H. Land
Richard J. Chen
John H. Lothrop
and
Richard R. Wareham
INVENTORS

BY Brown and Mikulka

ATTORNEYS

United States Patent Office 3,125,938
Patented Mar. 24, 1964

3,125,938
CAMERA APPARATUS FOR EXPOSING AND
PROCESSING PHOTOGRAPHIC FILM
Edwin H. Land, Cambridge, Richard J. Chen, Brockton, John W. Lothrop, Westwood, and Richard R. Wareham, Marblehead, Mass., assignors to Polaroid Corporation, Cambridge, Mass., a corporation of Delaware
Filed Aug. 8, 1962, Ser. No. 215,655
8 Claims. (Cl. 95—10)

This invention relates to camera apparatus for exposing and processing a multilayer photographic film assembly comprising a releasably contained processing liquid which, when released, produces a positive print through the diffusion transfer of image-forming substances. More particularly, the invention relates to a camera, of the character described, having alternate operational and control means for film assemblies of widely divergent exposure characteristics.

This application is a continuation-in-part of our co-pending application, Serial No. 102,047, filed April 10, 1961, for Camera Apparatus for Exposing and Processing Photographic Film.

The camera of the present invention includes various cooperating mechanisms which simplify the picture-taking operation, contribute to producing prints of improved quality, and render the camera adapted to the taking and processing of both black-and-white and full-color pictures. Previous cameras in this field, and more especially the camera forming the subject of the aforesaid copending patent application Serial No. 102,047, the largest relative aperture of which is $f/19$, have been constructed essentially for use with high-speed, black-and-white film materials. On the other hand, the present camera has a maximum relative aperture of approximately $f/14$ and is adapted to use with either high-speed, black-and-white film or color film of a relatively much slower speed. To properly meet the diverse exposure requirements of each type of film, special diaphragm, shutter, and photo-electric cell structures, together with control mechanisms relating thereto, have been embodied in the present camera.

Objects of the invention are to provide a camera of the character described in which are incorporated mutually operative manual and automatic devices for producing photographic prints of improved quality; to provide a self-processing type of camera incorporating relatively simple and effective means for exposing and processing both black-and-white and color film of widely divergent speed characteristics; to provide in a camera, as described, cooperating elements for insuring that an exposure can be made only when the relevant camera mechanisms are properly set therefor; to provide a camera of the character described embodying flashgun means adapted to widely different exposure characteristics of film materials usable therewith; to provide a camera, as described, having photoelectric means automatically controlling shutter speed; to provide in a camera of the type described means for varying the amount of light incident on the photoelectric cell controlling shutter speed in accordance with different film materials employed; to provide a camera of the character described embodying a single, front-curving meniscus lens with a flat focal plane; to provide in a camera, as set forth, novel and convenient means for mounting and removing a flashgun battery; and to provide a camera as described having diaphragm aperture adjusting means for varying the sizes and shapes of diaphragm apertures including separate control means for black-and-white and color film materials.

Other objects of the invention will in part be obvious and will in part appear hereinafter.

The invention, accordingly, comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 9 is a schematic diagram of selectively obtainable diaphragm apertures together with relevant data individually applicable to black-and-white and color films;

Figure 11:
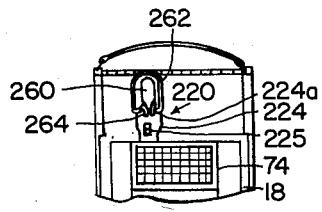
Figure 11A:
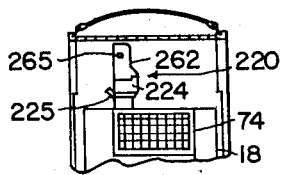
Figure 11B:
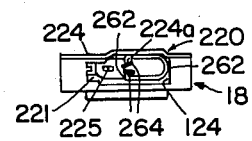
Figure 12:
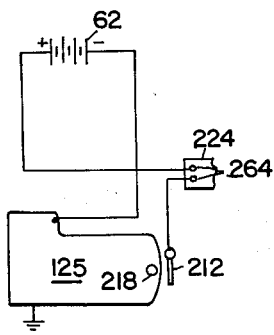

FIGS. 11, 11a, and 11b are diagrammatic views illustrating the unitary camera flashgun and several functional positions of the same;

FIG. 12 is a wiring diagram of the flashgun battery and switching means; and

Figure 13:
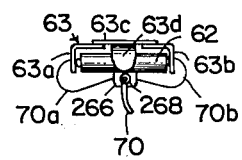

FIG. 13 is a diagrammatic view of the flashgun battery, battery clip and means for removing the battery.

A camera of the type concerned herein generally comprises means for supplying and exposing a photographic material which includes a film or layer of a photosensitive silver halide emulsion carried by a base or supporting layer and for processing the emulsion after its exposure. Through the diffusion transfer of image-forming substances, the processing operation provides a positive print on a second film or sheet material which is termed an image-receiving sheet or surface and which is either integral with the first-mentioned film or separately supplied in the camera and brought to superimposition therewith. A processing liquid is releasably contained on or within the film assembly, preferably in a rupturable liquid container attached to the image-receiving sheet, and is spread throughout the exposed emulsion area, when superimposed with the sheet, through movement of the materials relative to pressure-applying members of the camera. The image-receiving sheet may, of itself, serve as the carrier for a visible print of a latent image formed in the emulsion by the photographic exposure or it may carry a surface coating specially serving such a purpose as, for example, one composed of a solidified substance in the processing liquid. The diffusion transfer of image-forming components from the emulsion to the image-receiving surface to produce the print involves the development of a latent image in the exposed emulsion to an image in silver. In the case of producing a black-and-white image this is accompanied by the formation in the emulsion of a soluble silver complex which is caused to transfer to the image-receiving sheet. In the production of a print in color, various color-providing substances such as dyes, color couplers or other color-providing instrumentalities may be employed in the diffusion transfer process.

Photographic materials and processes of the general type contemplated in the aforementioned diffusion transfer methods are described in detail in U.S. Patents Nos. 2,543,181, 2,614,926, 2,707,150, 2,968,554 and 2,983,606. The camera apparatus described herein is not strictly limited to any particular photosensitive film or image-receiving material. However, in general, materials of the above-described types are contemplated for use therewith. The camera is adapted to use with a fast film of the category mentioned in the copending application of Land et al., Serial No. 564,492, filed February 9, 1956. One such fast film having an A.S.A. film speed of 3000 is now being commercially sold by applicants' assignee. The camera is also eminently suited for use with a color film as, for example with suitable color films having A.S.A. film speeds within a range of 50 to 100. As will be apparent, an ability to operate efficiently with films having such widely different speed characteristics places a considerable burden on the picture-taking capabilities of a camera and particularly so with respect to the subject camera which has a comparatively small relative aperture.

The camera of the present invention may be characterized, broadly, as a self-processing camera. More particularly, it may be regarded as of a hand-held automatic type, employing photoelectric means for establishing proper shutter settings, in conjunction with manually adjustable diaphragm openings and manually actuated but simplified focussing means. Other features of the camera, together with novel combinations thereof will now be described in detail. Whereas certain of these features may bear some resemblance to those heretofore employed in other cameras in the self-processing or in different fields, they are so employed and combined herein as to provide a picture-taking device which has marked advantages over previous cameras of a generally related category in its simplicity, flexibility, and ease of operation and by reason of its ability to produce prints of extremely high quality.

Figure 1:
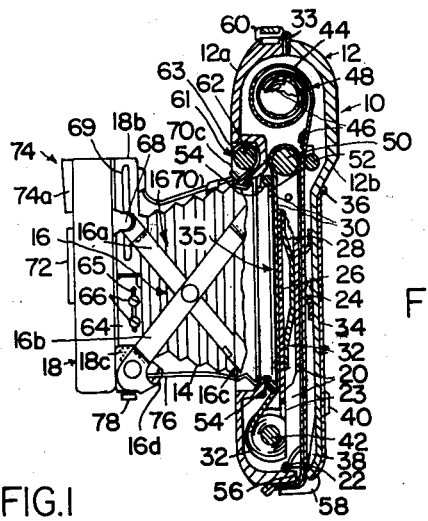
FIGURE 1 is an elevational view, partly in section, of the camera of the invention taken from the left-hand side.

Referring now to the drawings, the camera 10 is shown in FIGURE 1 from the left-hand side and will be noted as being a hand-held camera of a folding type. Basically, the camera comprises a main housing or back 12 containing processing apparatus in which a film is positioned for exposure and processing, a bellows 14, a scissors type erecting mechanism 16, and a front 18, the latter containing the principal elements for accomplishing the photographic exposure including a photovoltaic cell and the lens, shutter and diaphragm components.

The structure of the camera back 12, containing the film processing apparatus, may be considered as generally conventional but possessing a few unique features which will appear hereinafter. The back 12 is divided into two principal chambers, namely, into what may be termed a front or exposure chamber and a rear or processing chamber, by pivotal wall member 20, the latter being hingedly connected to the casing at 22. The terms front and rear, as used herein in referring to the location of components, relate to their proximity to, or remoteness from, the front of the camera or the object being photographed. The forward position of pivotal member 20 is established by flange elements 23 extending from the casing and by a pair of spring finger elements 24 (one shown) attached to the rear wall of the housing and bearing against the rear edges of member 20. A pressure plate 26 biased by a spring 28, respectively attached thereto and to pivotal wall member 20, taken with frame elements 30, holds the film material 32 properly at the focal plane of the camera. The camera back is constructed of front and rear wall sections 12a and 12b, respectively, pivotally connected to one another at hinge 33 and held at closed position at the bottom by a latch 13, shown in FIG. 3. The rear wall section 12b, in turn, includes an access means thereinto in the form of a door 34, hinged at 36 and having a latch 38, with a release button 40. Door 34 is employed, primarily, to lift out each completed print along semi-perforations from a continuous strip of image-receiving sheet material.

A supply of the film 32 in roll form is contained on a spool 42. A supply of the image-receiving sheet material 44 composed, for example, of a roll of baryta-coated paper and having a plurality of rupturable containers 46 releasably holding a processing liquid which are located at given intervals on the image-receiving surface, is somewhat loosely mounted in an appropriate compartment or sub-section 48 of the back.

A pair of pressure rolls 50 and 52 is mounted within the camera back. These rolls are employed to apply pressure progressively to the exposed film 32 and image-receiving sheet 44, when they are drawn there-between in superimposed relation, and to rupture the liquid container and spread the processing liquid throughout the emulsion area. Pressure roll 50 is mounted in front section 12a while pressure roll 52 is mounted in rear section 12b, the two rolls being positioned contiguously when these two sections are pivoted to closed position.

The photosensitive film material 32 and sheet material 44 are loaded in the camera by opening the rear section 12b and then swinging the inner pivotal wall member 20 to open position. As above explained, this separates the pressure rolls, due to their being mounted in the individual sections and also provides access to the interior of the camera. In loading the film material into the camera, a leader of the film 32 is drawn across the focal plane 35, past guide rolls 54, around pressure roll 50 and across the back of pivotal member 20. A leader of the image-receiving sheet 44 is guided around pressure roll 52 and across the back of pivotal member 20 is superimposed relation with the film leader 32. The most advanced superimposed portions of the two leaders are then positioned in an exit aperture 56 provided by a narrow gap between the front and rear sections 12a and 12b so that a small tab composed of the two leaders extends exteriorly of the housing. The film and receiving sheet materials are usually supplied as components having their leaders attached to one another to facilitate proper loading in the camera and thus may be considered as constituting a single unit. Complete instructions are provided for installing and metering the materials to functional positions to the effect that emulsion areas are properly positioned for exposure and the liquid containers and image-receiving areas of the image-receiving sheet are properly positioned relative to the exposed image areas of the film. This occurs automatically once the leaders have been threaded. A pivotal cutter bar 58, adjacent to the exit aperture 56, has a cutting blade which is movable across the aperture and serves to sever lengths of exposed, processed and to-be-discarded negative film material which have been superimposed with waste portions of the image-receiving sheets, these materials being portions which remain and are not usable after completion of the print. Where the film is of a type which produces a permanent negative, the latter is, of course, preserved.

Further considering the camera back 12, a handle 60 is included for carrying purposes. A recess 61 is provided in the camera back 12 for releasably mounting a battery 62 which serves as a voltage supply for the flashgun. The battery is releasably mounted in a clip 63 and structure relating thereto is shown in FIG. 12 and will be described in detail below.

The camera front 18 is connected at either side of bellows 14 with the back 12 by scissors type supports 16 comprising link elements 16a and 16b. The split and folded-over construction of elements 16a in portions 16c thereof nearest the camera back provides a frictional contact of these portions with elements 16b when the camera front is folded within the back and serves, in contrast to usual spring-type holding means, to releasably hold the front at this closed position. The links 16b are connected at the bottom by a cross-piece 16d, unitary therewith, and their upper extremities are slidably mounted in tracks (not shown) provided within the sides of the housing. The bellows 14 is constructed of any suitable flexible material as, for example, of a cloth impregnated with a plastic and provides a conventional light-tight enclosure between lens and focal plane. On each side of the camera front is an adjusting plate 64 having a slot 65 formed therein and a pair of adjusting screws 66 which pass through the slot and are threaded in the front 18. These elements are employed in conjunction with a preliminary or factory-performed collimating adjustment, namely, an adjustment of the spacing between the lens and the focal plane. A further reference to this adjustment will be given below relative to FIG. 5. Other elements, shown in FIGURE 1, include a two-position detent-actuating button 68 which permits optional insertion of a stud 118 (similar to that shown in FIG. 5) in either of two recesses. The shank of the stud passes through slot 69 and is attached to the extremity of the link 16a. This structure permits adjustment of focus to two positions. Also shown are the electrical cable connector 70, the diaphragm adjusting bezel element 72, the photocell 74, the shutter release actuating cable 76, and the shutter tensioning lever 78.

Figure 2:
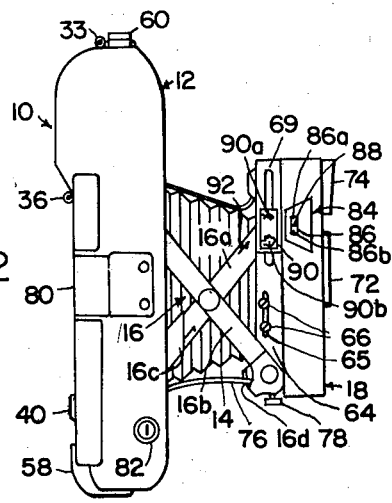
FIG. 2 is an elevational view of the camera taken from the right-hand side.

In FIG. 2, the camera is shown from the right-hand side. Elements additional to those illustrated in FIGURE 1 include a viewfinder 80, a shutter release button 82 and an indicator 84, constituting, in effect, an exposure meter, which provides a reading of the light available for the exposure. The light indicator 84 comprises a dial 86 and pointer 88, the pointer being actuated by a galvanometer 85 mounted within front 18 and shown in FIG. 6. The galvanometer is responsive to voltage fluctuations in the circuit of photovoltaic cell 74 and, in turn, controls shutter speed, as will be explained hereinafter. The dial 86 is composed of two background sections in side-by-side relation, across which the pointer is free to move, namely, a generally white section 86a and a dark section 86b. Assuming a workable light level for picture taking to exist, when the pointer is positioned against the white background, it indicates that the available light and the position or aim of the camera are such as to provide a degree of light incident upon the photovoltaic cell 74, and, coincidentally, upon the film when the shutter is actuated, which will enable automatic control of shutter operation to produce a satisfactory print. When the pointer is seen against the dark background, the incident light is indicated as being insufficient for proper operation due to the generally inadequate prevailing light level or to incorrect aim of the camera. Correction for additional light may be obtained through adjustment of adjusting bezel 72 or by use of a flashgun, to be described below.

A multi-prismatic transparent plate is mounted across dial 86. The angles of the prism surfaces are so chosen as to make it possible for the operator to see pointer 88 only when the camera is properly aimed with respect to the photographic subject. This position is substantially achieved when it is possible to see the pointer when looking through the viewfinder 80.

Also shown is a plate 90 containing symbolic indicia for use in establishing proper focus for general and close-up photography. Plate 90 is secured to the face of a detent-actuating button similar in function to button 68 and operable therewith. The plate 90 contains a representation of human figures 90a, symbolizing a setting for general picture taking, e.g., from approximately five feet to infinity, and a human head 90b representing a setting for close-up picture taking, e.g., from approximately three and one-half to eight feet. These values are given for a diaphragm setting of approximately f/45 with the diaphragm aperture assuming the generally arcual shape shown in FIG. 9. An arrow 92, formed on link 16a, points toward one or the other of these symbols depending upon whether the subject is located for a "general setting or for a "close-up setting. The plate 90 of FIG. 2 and the detent button 68 of FIGURE 1 are pressed inwardly at the same time to change the setting. This releases each of the studs 118 from its location in one of the two apertures 114 and 116, shown in detail in FIG. 5, and enables its placement in the other aperture. The foregoing operation is performed by moving the front 18 in or out causing movement of the shank of the stud, which is attached to the extremity of link 16a, along slot 69 while, coincidentally moving the upper extremities of links 16b along their tracks in the housing. When the stud 118 is located in the upper aperture, as represented by arrow 92 pointing toward human figure symbol 90a, the scissors supports 16 are slightly closed and the spacing between the lens and focal plane is diminished. When the locking stud is in the lower aperture the arrow 92 points toward the face symbol 90b, the scissors supports 16 are slightly opened and the spacing between the lens and focal plane is at its maximum. The foregoing mechanism permits a rapid and simple adjustment of focus according to variations in distance between the camera and the photographic subject.

Figure 3:
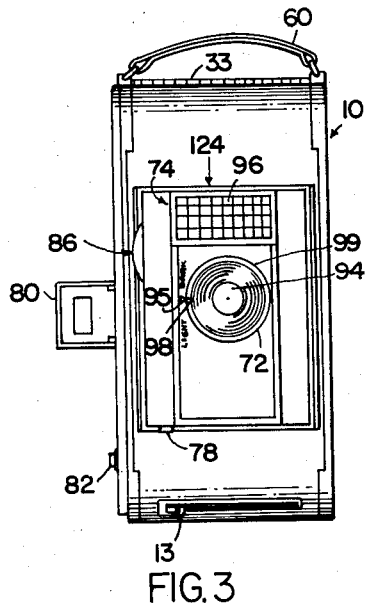
FIG. 3 is a front view of the camera including structure used with black-and-white film.

In FIG. 3, the camera 10 is illustrated from the front. Elements not previously shown include the single, front-curving, meniscus lens 94, the latch 13 which is pivotable outwardly toward the viewer to release the front and rear casing sections 12a and 12b from closed locking relation, and a honeycomb type of grill 96 covering the face of the photovoltaic cell 74. The diaphragm aperture is varied in size and shape, as described in detail relative to FIGS. 7 and 8, by rotating the bezel 72. The red index mark 98 on the bezel is moved to either the "lighten" or "darken" positions designated on the camera front or at the median index mark 95, as indicated to be necessary by the position of the point 88 of the dial 86 or by the quality of a just-previously-completed print. Assuming that a subject at practicable range is being photographed the flashgun may be employed if additional light is required. The viewfinder 80, shown at open position, may be of any suitable type, a so-called "Albada" type of viewfinder being that preferably employed.

Figure 4:
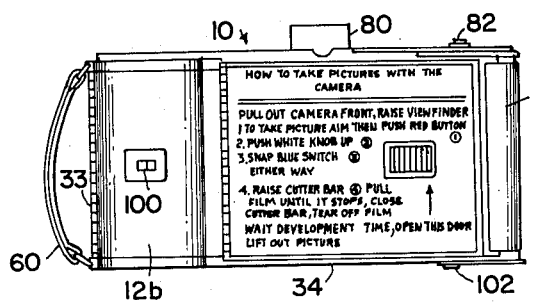
FIG. 4 is a rear view of the camera.

The camera is shown from the rear in FIG. 4. Illustrated are two elements not seen in previous figures. One of these elements is a button or switch 100 which controls internally located detent means (not shown) facilitating proper metering of the film and image-receiving sheet materials during the processing operation. The other element is a tripod socket 102. Also shown is the wording of a series of steps relating to the photographic exposure and processing operations. The numbers refer to those actually stamped on the actuating elements and shown in FIGS. 2, 3 and 4.

Figure 5:
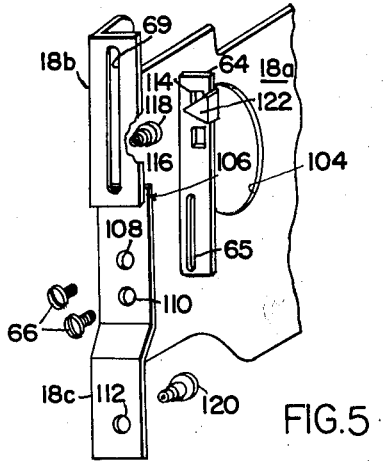
FIG. 5 is a diagrammatic exploded view of focus adjusting mechanism of the camera.

FIG. 5 illustrates the preliminary collimating adjustment means alluded to with respect to FIGURE 1, it being understood that said means is duplicated at left and right sides of the camera. Plate element 18a is that portion of the camera front 18 within which, in aperture 104, the meniscus lens and diaphragm are mounted and around which aperture the lens bezel is positioned. Element 18b is a right-angled plate integral with but projecting outwardly beyond element 18a, as shown. Element 18c is a plate, contoured as shown, having perforations 108, 110 and 112, and is an element integral with an extending at 90° from an edge of plate element 18a. However, plates 18b and 18c are spaced from one another as shown at 106. Elements 18a, 18b and 18c are preferably formed of a rigid metallic sheet material. Plate 64, formed of a resilient material such as a metal and having two rectangular apertures 114 and 116 and an elongated slot 65, is positioned in the space 106 between plates 18b and 18c so that slot 65 is aligned with apertures 108 and 110 of plate 18c, and apertures 114 and 116 of plate 64 are aligned with slot 69 of plate 18b. A stud 118 is positioned between plates 64 and 18b with its shank protruding through slot 69 and passing through an eye in the upper extremity of erecting link 16a. Perforation 112 is connected with an eye in the lower extremity of link 16b by stud 120. Detent button 122 is that to which indicia plate 90 of FIG. 2 is attached, as previously described. Screws 66 pass through perforations 108 and 110 and slot 65 and are threaded in side portions of camera front 18. As will be apparent, when screws 66 are loosened, plate 64 can be moved up or down thus raising or lowering the location of rectangular apertures 114 and 116 into which the head of stud 118 may alternatively be positioned. The stud is released from its location in either of apertures 114 and 116 by pressing manually upon detent release button 122. This serves to bend the resilient plate 64 inwardly removing it from the stud and permitting the shank of the latter to slide freely in slot 69 as provided by link 16a when the camera front is moved inwardly or outwardly. By moving plate 64 upwardly or downwardly and then tightening the screws 66 a basic collimating setting is obtained. In résumé, the operational settings, previously described with respect to FIG. 2 and the position of the arrow 92, at 90a or 90b, are obtained by alternatively locating the head of the stud in apertures 114 or 116 merely by simultaneously pressing inwardly on the elements 90 and 122 and moving the camera front in or out.

Figure 6A:
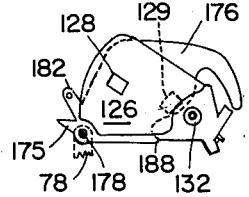
FIG. 6a is a fragmentary view showing portions of the shutter and switching mechanism of FIG. 6 in greater detail.
Figure 6:
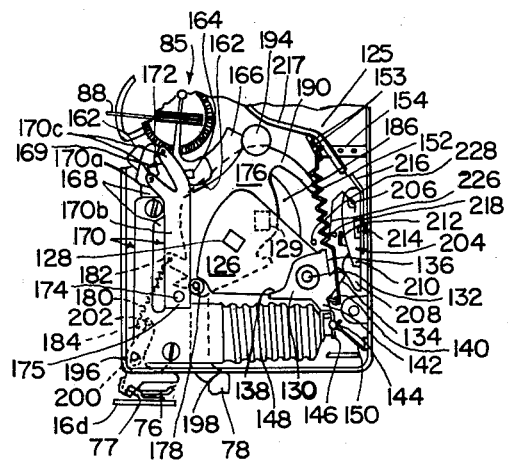
FIG. 6 is an interior rear view of a portion of the camera front showing, diagrammatically, the shutter and switching mechanism for actuating the electrical currents.

The shutter and switch actuating mechanism for firing a flashgun is housed in the camera front 18 and is shown in detail in FIGS. 6 and 6a from a position facing the camera as illustrated in FIG. 3, with the casing removed. The flashgun is mounted in a recess or well 124 formed in the upper side of the camera front 18, immediately adjacent to the photovoltaic cell 74, as shown in FIGS. 3, 11b and 13. In FIG. 6, the shutter mechanism is illustrated in a functional condition at which it is to be assumed that an exposure has been made by pressing the shutter release button numbered "1," and that the flashgun has been fired. In FIG. 6a the shutter blades are shown at tensioned position. The complete mechanism is mounted on a mounting plate 125, releasably insertable in and fastened to camera front 18 by removable screws. The device comprises a front shutter blade 126, having an exposure aperture 128, rigidly attached to a pivotal plate member 130, the latter being rotatably mounted at bearing means 132 so that both elements 126 and 130 rotate as an integral unit. The plate member 130 includes a cam element 134, a cam element 136, a cam follower 138, and an arm 142.

To meet the dual requirements of accommodating to an extremely fast black-and-white film, e.g., one having an A.S.A. speed of 3000, and to a color film having an A.S.A. speed of, for example, from 50 to 100, the exposure aperture 128 of the shutter blade 126 has been doubled in width over that which would be employed if only the aforesaid fast black-and-white film were to be used, thus effectively halving the shutter speed which would be possible with the narrower shutter blade aperture. In conjunction therewith, the diaphragm apertures have been reduced in size for given "automatic," "lighten" and "darken" black-and-white settings but have been enlarged to provide f/16 and f/14 lens speeds or relative apertures for color, as shown in detail in FIG. 9, the differences again being with respect to the apertures which could suitably have been provided for the above-mentioned fast black-and-white film alone.

Further referring to FIG. 6, a forwardly extending stud 144 is mounted at the extremity of arm 142. A clamp 146 is pivotally mounted on the stud 144. The clamp 146 engages one end of a pneumatic bellows 148. The bellows may appropriately be formed of rubber or a synthetic resilient material of similar characteristics. A flat spring 150 limits the expansion of the bellows in a direction toward full extension. A small projection from arm 142 has an eye 140 formed therein to which is connected one end of the front shutter spring 152. The other end of the front shutter spring is connected to a selected one of a plurality of slots 153 formed in a post 154, the slots permitting adjustment of spring tension. The front shutter spring 152 biases plate 130 and the front shutter blade 126, integral therewith, in a counterclockwise direction. Spring 152 also exerts pulling force on the bellows 148 to provide a maximum extension of the bellows.

The galvanometer 85 is operated in response to current from the photovoltaic cell 74. The pointer 88 of light indicator 84 is attached to the rotatable coil of the galvanometer. Counterclockwise rotation of the coil, as viewed in FIG. 6, causes the pointer to move to a position in front of the dark portion 86b (FIG. 2) of the indicator dial which would indicate inadequate light. A flat vane 162 is also attached to the coil and is rotatable therewith. The vane has an aperture 164 of substantially continuously tapering width formed therein, the aperture portion shown being the widest part thereof. Underlying this vane is an elongated partially curved air chamber or passage 166 leading to bellows 148 and, between the vane and air chamber, a plate member 168 fastened to the air chamber and having an orifice 169 formed therein leading to an underlying orifice of the air chamber at that curved portion of the latter which lies under the aperture of the vane so as to be aligned with said tapered aperture as it is moved thereacross. The tapered width of the vane aperture 164 thus allows varying amounts of air to enter the orifice of plate 168 according to the rotational position of the vane, as determined by the current from the photovoltaic cell which controls operation of the galvanometer.

Overlying the movable vane 162 is a two-element clamping member 170, composed of a resilient material such as Phosphor bronze, having an orifice 172 formed in its underlying element 170a which is similar in shape to, but slightly larger than, the orifice 169 of plate 168 and which overlies, respectively, the vane orifice 164 and orifice 169. The underlying element 170a of clamping member 170 is caused to bear directly upon vane 162 just prior to positioning the shutter aperture 128 across the diaphragm aperture 244 (of FIG. 7) to insure that no air enters the orifice 169 of plate member 168 and thence to the air chamber other than through vane aperture 164. The overlying element 170b of clamping member 170 serves a reinforcing clamping function relative to underlying element 170a, it being noted that the two-fingered component 170c of element 170b contacts elements 170a for the purpose. A stud 174 extends inwardly from clamping member 170. This stud is actuated by lug element 175 protruding laterally from the rear shutter blade 176 to control the above-described clamping action of clamping member 170 and will be explained below.

The rear shutter blade 176 underlies the front shutter blade 126. The rear blade 176 performs several functions among which are those of serving, per se, as a component of the shutter, driving the front shutter blade 126 in a clockwise direction against the bias applied by shutter spring 152, actuating the clamping member 170 in a direction normal to the plane of the drawing paper, and contributing to control of the flashgun contacts. Rear shutter blade 176 is pivotally mounted at bearing means 178 and is biased for rotation in a counterclockwise direction by the rear shutter blade spring 180 which exerts a considerably greater tensioning force than does the front shutter blade spring 152, namely, a force which is sufficient to overcome both the bias applied by spring 152 and the inherent bias toward extension of pneumatic bellows 148. Spring 180 is attached, respectively, to arm 182 of the rear shutter blade and to a fixed stud 184 mounted on plate 125. Rear shutter blade 176 has a rectangular aperture 129 formed therein which is aligned during the exposure with a fixed aperture (not shown), formed in a plate 186 attached to the mounting plate 125. Plate 186 provides a shield or baffle for preventing the entrance of unwanted light at locations other than through the designated apertures. To accomplish the photographic exposure, the aperture 128 of the front shutter blade passes across the aperture 129 of the rear shutter blade when the latter is in alignment with the aperture of plate 186.

The rear shutter blade 176 also includes a cam element 188 which, assuming the shutter to have been tensioned and shutter release button 82 to have been pressed, contacts cam follower 138 of the front shutter blade 126 during counterclockwise movement of the rear shutter blade and causes the front shutter blade to rotate in a clockwise direction until cam 188 breaks contact with follower 138. At this stage the front shutter blade commences to rotate in a counterclock direction and it is during this movement that aperture 128 passes across the aperture 129 of rear shutter blade 176 and that of plate 186 and the exposure is performed. The limit of this counterclockwise rotation is determined by contact of stud 144 with the spring-like limit stop 150.

The rear shutter blade 176 additionally includes a cam 190 and a lug 175. When the shutter is actuated, lug 175 contacts and applies torque to the post 174 which causes clamp member 170 to move in the aforesaid direction normal to the plane of the paper, as previously described, and bear upon the vane 162. This occurs just prior to the photographic exposure, that is, just before the shutter aperture 128 moves across the aperture 129 of rear shutter blade 176 and that of plate 186. Movement of the rear shutter blade in a counterclockwise direction about pivotal bearing 178, as biased by spring 180, is limited by a stop 194.

The rear shutter blade is rotated to the tensioned position by a tensioning or cocking lever 78, rigidly attached thereto. It is held at this position by the shutter release pawl 196 which engages flange 198 of the tensioning lever. Pawl 196 is biased toward engagement by spring 200 and its movement is limited by a stop 202. The release pawl is actuated by the shutter release button 82 through the intermediary of the flexible cable 76. The tip of the actuating wire in the flexible cable is at a position, as provided by holding bracket 77, to actuate the pawl 196 only when the camera is at open position with the camera bellows 14 and linkage 16 properly extended. The cross member 16d, on which the pawl is mounted, is rotated through closing movement of the links 16a and 16b and carries the cable wire tip out of contact with the pawl. This constitutes an interlock means which prevents an exposure unless the camera is basically correctly adjusted. The camera cannot be closed unless the shutter tensioning lever 78 is slightly retracted to tensioned position. This insures that the shutter blades are at best position to prevent any light leak, which is of importance inasmuch as the camera has no front cover.

The speed at which the shutter operates is controlled by the location of the tapered orifice 164 in vane 162 with respect to the underlying orifices to the air chamber. During the first part of the cycle of shutter operation, this location controls the amount of air which is allowed to escape through the orifices and vane aperture from the pneumatic bellows which is undergoing contraction by reason of the clockwise movement of arm 142, under bias applied from the rear shutter blade spring 180 via cam 188 and plate 130. During the second part of the cycle of shutter operation when the front shutter spring 152 assumes control, arm 142, as previously described, is caused to rotate in a counterclockwise direction thus causing the pneumatic bellows 148 to expand. During this operation the position of the vane 162 therefore controls the amount of air permitted to be drawn into the orifices, air chamber and bellows and thus controls the speed of the actual exposure which, as noted, occurs during this portion of the cycle.

Completing the description of the shutter and electrical switch actuating mechanism, a pivotal arm 204 composed of an electrical insulating material, such as micarta or the like, is mounted for rotation about a pivot 206. Arm 204 comprises cam followers 208 and 210, electrical contact 212, adjusting screw 214 for varying the position of contact 212 and a cable-connecting lug 216 to which an end of electrical cable 217 is soldered. Cable 217 leads to one contact of the flashgun socket 224. When arm 204 is permitted to rotate in a clockwise direction, a flash synchronizing switch composed of the movable contact 212 and a fixed contact 218 closes and thus actuates the flashgun 220, shown in FIGS. 11, 11a and 11b. Spring element 226 biases arm 204 in a counterclockwise direction so that the contacts are normally open. The fixed electrical contact 218 is electrically connected to ground, namely, to the mounting plate 125. In turn, plate 125 is electrically connected to one side of the 1½ volt battery 62 by means of battery clips 63.

At the position shown in FIG. 6, which, as previously stated, assumes the shutter to be at a non-tensioned position after completing a photographic exposure, it will be observed that cam 134 of plate 130, integral with the front shutter blade, is in contact with cam follower 208 of the pivotal arm 204 thus holding contacts 212 and 218 apart. When the shutter is tensioned, cam 190 of the rear shutter blade 176 is rotated in a clockwise direction and brought into contact with cam follower 210. Upon release of the tensioning lever by withdrawal of pawl 196 the following sequence takes place. Through coincidental clockwise rotation of front shutter blade 126 and counterclockwise rotation of rear shutter blade 176, cam 134 is removed from cam follower 208; cam 190 stays in contact with cam follower 210 for a brief period, thus maintaining the separation of electrical contacts 212 and 218; and cam 136 then moves into contact with cam follower 208, further continuing their separation. At this stage cam 188 of the rear shutter blade 176 passes beyond cam follower 138 of the front shutter blade, the rear shutter blade comes to rest against stop 194, and the front shutter blade commences its return in a counterclockwise direction. Cam 136, simultaneously, commences its withdrawal from cam follower 208 and the electrical contacts are closed at a point in time which is approximately twelve milli-seconds prior to maximum alignment of the shutter and diaphragm apertures, thus permitting full transmittal of light for any given setting of the diaphragm. This period permits the lamp filament to be heated to a temperature for achieving maximum brightness of illumination.

Closing of the contacts is momentary and they return to open position substantially immediately, as determined by the return of cam 134 to contact with cam follower 208. This avoids any possibility of inadvertently firing a replacement flashbulb during its insertion.

Figure 7:
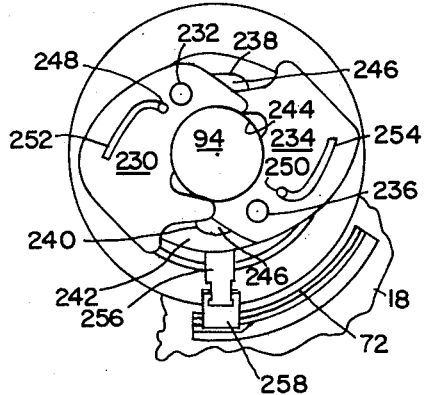
FIG. 7 is a diagrammatic perspective view of the diaphragm adjusting mechanism.

In FIG. 7, there is shown, as viewed from the rear, an assembly of the diaphragm elements which are positioned in camera front 18 behind the lens 94. A first blade 230 is pivotally mounted on a fixed stud 232 and a second blade 234 is pivotally mounted on a fixed stud 236. The studs 232 and 236 pass freely through arcuate slots 238 and 240 formed in a rotatable cup-like plate 242 having a central circular aperture 244 and are fixedly mounted in a second cup-like plate 246 over which the plate 242 is rotatably cupped or nested, a small part of the plate 246 being visible through the slots 238 and 240. As will be apparent, the slots permit the rotation of plate 242 on plate 246 to an extent which is terminated by contact of the studs with the slot extremities. Plate 246 has a rear aperture (not visible) similar to and aligned with aperture 244 and a front aperture or cup rim which is only slightly smaller in diameter than that of lens 94 and serves as the rear mounting element for the lens. Plate element 242 also includes pins 248 and 250 which extend, normal to the plane of the paper and toward the viewer in FIG. 7, through curved slots 252 and 254 formed in blades 230 and 234, respectively, and a radially extending lug 256 which is connected to a driving arm 258 attached to adjusting bezel 72. Rotation of the bezel 72, arm 258 and lug 256 causes the pins 248 and 250 to move circularly about the optical axis of lens 94 and to bear varyingly against the edges of slots 252 and 254, which are at different distances from said optical axis, in a camming operation thereby causing the diaphragm aperture to assume the various sizes and shapes shown in detail in FIG. 9. The diaphragm is so constructed that although its aperture assumes various contours, the width, that is, in a direction approximately similar to that in which the shutter blade aperture moves, from $f/22$ through $f/63$, is maintained approximately constant. As indicated by the surrounding dotted line, the aperture for $f/22$, although generally elliptical, may also be regarded as constituting an approximate rectangle.

Figure 8:
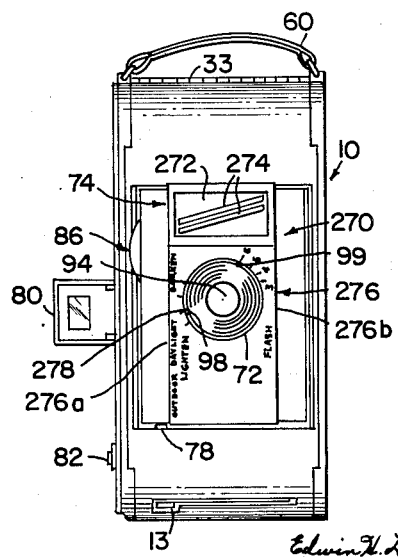
FIG. 8 is a front view of the camera including structure used with color film.

FIG. 8 illustrates the camera from the front, with particular reference to a subassembly 270 which is employed when using color film. This subassembly supplants the grill 96 and the "lighten"-"darken" scale of FIG. 3, previously described with respect to black-and-white film, to provide correct aperture settings and light readings at exposure meter 84 for color film of much slower speed characteristics. The assembly comprises a cup-like mask or shield 272 having light-admitting slots 274 which lessen the amount of light reaching and transmitted by the honeycomb grid 96 with which the mask is superimposed so that the light incident on photocell 74, is reduced, for example, by a three-stop value. Integral with the mask, is a covering plate element 276 composed of an opaque material such as a metal. The slots 274 are disposed diagonally to insure their being aligned with substantially similar portions of the horizontally and vertically disposed honeycomb elements of the grid 96 in terms of light-blocking and non-light-blocking portions of the elements, regardless of any differences in alignment of the mask 272. If the slots were disposed horizontally or vertically, for instance, and such misalignment existed, they might be superimposed with an excess of opaque portions forming the grid and less light than intended would reach the photocell. Overexposure would probably result. One portion 276a of the covering plate contains indicia for daylight outdoor use. This indicia includes a median index mark 278 and "lighten" and "darken" positions designated by fixed index marks relative to which the index mark 98 of the rotatable bezel 72 may be located. A second portion 276b of the plate is intended for flashgun operation. Inscribed on the latter are positioning index marks and associated numerals relative to which the second index mark 99 of the rotatable bezel may be located. The numerals designate various distances, in feet, from the camera to the photographic subject, it being appreciated that less light from the flashgun reaches the subject the more distant it is from the camera and vice versa. Accordingly, the diaphragm aperture is opened increasingly as the bezel is turned in a counterclockwise direction and the index 99 is moved toward the higher footage values and stopped down when the index 99 is moved toward the lower values. The assembly 270, intended for use with the slower color film, is held firmly in place by the slidable contact of the cup-like, rearwardly extending side portions of the mask 272 over the sides 74a of the frame or housing enclosing the photovoltaic cell 74. The assembly 270 may easily be removed for black-and-white photography and set aside or, alternatively, the assembly 270 may be permanently mounted on the camera as, for example, by hinge means and swung into and out of functional position.

The median index mark 95, located midway between the positions adjacent to the words "lighten" and "darken" in FIG. 3, is provided as the automatic or normal setting for black-and-white film having a given speed as, for example, an A.S.A. film speed of 3000, for which the shutter mechanism of FIG. 6 is adapted to function. By an automatic setting of the rotatable index mark 98 is meant that setting at which the range of $f$/No. values, described below with respect to FIG. 9, may be provided automatically through control of shutter speed by the photovoltaic cell 74, galvanometer 85 and associated shutter mechanism illustrated in FIG. 6. As shown in FIG. 3, the automatic setting for black-and-white film is obtained by positioning the movable index mark 98 at the fixed index 95. For color film, having the aforesaid much slower speed, the automatic setting is obtained, as shown in FIG. 8, by positioning the index mark 98 at the fixed index 278. To more rapidly identify the two movable indices 98 and 99, the former, for flash operation, is colored blue and the latter, for daylight outdoor operation, is colored red.

In FIG. 9, there are shown, at given conditions of illumination, comparative exposure values, shutter speeds and relative aperture values applicable to the camera of the present invention and to given types of film suitable for use therewith. The various data of FIG. 9 apply to photosensitive emulsions of black-and-white and color film assemblies for use with the camera of the invention, wherein a processing liquid is made available and an image is provided by a diffusion transfer process. It is, however, to be understood that photosensitive emulsions having other sensitivity characteristics may be employed without modification of the shutter or diaphragm if generally within the ranges set forth herein. If not within said ranges, modifications of the shutter, diaphragm and control means along the structural lines described herein may be made, within the scope of the invention, to obtain the proper coordination therebetween. Also illustrated in FIG. 9 are various contours and relative sizes of diaphragm aperture openings at given $f$/No. values within the ranges set forth for each type of film. It will be noted that the openings, exclusive of that at $f/14$, are of similar dimensions, horizontally, namely, in the direction of movement of the shutter blade aperture, but differ in a vertical direction. By limiting these differences substantially to one direction, an accuracy of aperture area differences and exposure values is facilitated. The particularly large aperture at $f/14$ provides a maximum light-gathering capability for use with the color film. When using the unmasked photoelectric cell and diaphragm setting indicia means for black-and-white A.S.A. 3000 speed film, as shown in FIG. 3, the automatic exposure range will be noted as at a relative aperture of $f/45$, with an extended range through diaphragm adjustment from $f/14$ to $f/64$, inclusive. In conjunction with the photocell masking means and modified indicia means for A.S.A. 50 speed color film of FIG. 8, the automatic exposure range is at a relative aperture of $f/16$, with an extended range to $f/14$.

Figure 10:
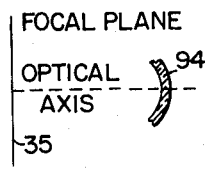
FIG. 10 is a schematic diagram relating to the camera optical system.

FIG. 10 is a simplified schematic diagram of the optical system showing the general relation of the front-curving meniscus lens 94 and the focal plane 35. A relatively simple lens of this type is practicable because of the small aperture employed, edge corrections thereby being avoided.

FIGS. 11, 11a and 11b illustrate various positions of the socket 224 which may be employed in conjunction with a mounted flashgun 220. The socket is pivotally mounted at 221 in recess 124 which is formed in camera front 18 at the end adjacent to photovoltaic cell 74. In FIG. 11, the flashgun, comprising bulb 260 and reflector 262, is so positioned as to face straight ahead toward a photographic subject. The socket 224 includes a cutaway portion 224a, a bulb ejector 225 and a pair of terminals 264 allowing a conventional flashbulb base to be inserted from the side rather than from the end. This permits installation of the bulb without removing the reflector 262. The reflector is of an extremely small size enabling retraction of the entire flashgun unit in recess 124. Although so small in size, the reflector is adequate when the black-and-white A.S.A. 3000 speed film is employed. The compact reflector 262 possesses an advantage in that it tends to eliminate the so-called "hot spot" of light which, as evidenced in a finished print, has been indicated as incident upon the photographic subject when using more conventional reflectors. When color film of the type hereinbefore described is used, a separate flashgun unit, not shown herein, is employed. This unit comprises an adapter, a light source of higher intensity and an associated reflector. The adapter is inserted in the socket 224 in place of the bulb 260. The unit is described in detail in the copending U.S. application, Serial No. 196,370, filed May 21, 1962.

FIG. 11a illustrates the flashgun at correct position either for bounce flash operation when the camera is held horizontally or for close-up photography when bounce flash is not possible because of the proximity of the subject. In the latter instance, the small orifice 265 formed in reflector 262 permits an amount of light to fall upon the subject which is similar to that which would be the case if the subject were slightly more distant and bounce flash were employed. For this purpose, assuming a light bulb having a light output of approximately 7000 lumiseconds, a circular orifice having a diameter of 1/8 inch has been found to produce excellent results.

In FIG. 11b, the flashgun 220 is shown retracted within recess 124. At this position and with the bulb 260 installed, it is properly disposed for bounce flash operation when the camera is held vertically. It is also correctly located for closing of the camera during non-use. The flashgun may also be positioned diagonally for a modification of bounce flash operation.

FIG. 12 is a wiring diagram of the circuit involving the 1½ volt battery 62, the flashgun socket 224, the electrical contacts 212 and 218 of the shutter mechanism of FIG. 6, and the mounting plate 125 for this mechanism which is mounted in the camera front. This circuit is employed for operating the flashgun 220.

FIG. 13 shows, in detail and from a viewing position facing the camera back from the front, the battery 62, the battery clip 63, and means for removing a spent battery from the clip. The battery clip is formed of resilient pieces 63a and 63b which make electrical contact with the opposite ends of the battery. These pieces are electrically insulated from one another, as by central insulating member 63c. The clip is mounted in a recessed area of the camera back 12, as generally shown in FIGURE 1. A tab 63d composed of a resilient material such as a springy metal contributes to releasably hold the battery in mounted position. A tape 266 having a grommet 268 is attached to the under side of the central portion of the clip, passes around the rear of the battery, and extends forwardly from the under side thereof, as shown. The electrical cable 70 passes through the grommet and has a retaining collar 70c on the far side. Leads 70a and 70b carried by the cable are connected to the battery clip end pieces 63a and 63b. One of these leads connects the battery with socket 224; the other connects the battery with mounting plate 125 which constitutes a common ground. An exhausted battery is manually removed by drawing upon cable 70. This tautens the tape 266 and exerts an ejecting force on the battery which is thus freed from the clip 63.

Since certain changes may be made in the foregoing apparatus without departing from the scope of the invention herein involved, it is intended that all matter contained in the above description or shown in the accompanying drawings shall be interpreted as illustrative and not in a limiting sense.

What is claimed is:

1. In a camera adapted to use both a fast black-and-white film and a comparatively slow color film and including an objective, a photocell, a shutter speed mechanism automatically responsive to current variations in the circuit of said photocell as provided by variations in the prevailing illumination, and manually actuated diaphragm adjusting means, the combination of shutter automatic speed control and diaphragm setting means for said fast film comprising frame means forming a window of relatively large area admitting a relatively large amount of light to said photocell so as to permit a wide range of shutter speeds, and a scale of indicia for setting said diaphragm adjusting means in relation to said wide range of shutter speeds, with shutter automatic speed control and diaphragm setting means for said slow film comprising a window of relatively small area formed in plate means which is positionable in front of said first-named window, and a scale of indicia inscribed on plate means which is positionable in front of said first-named indicia, said window of relatively small area admitting lesser amounts of light to said photocell so as to permit a smaller range of shutter speeds and an appreciably slower maximum speed under comparable illumination conditions than said large window, and said second-named scale of indicia enabling the correct positioning of said adjustable diaphragm means in relation to said smaller range of shutter speeds.

2. A camera, as defined in claim 1, wherein said positionable plate means is a unitary element so that said second-named window and second-named scale of indicia may be functionally positioned or removed from operable position together in a single operation.

3. A camera, as defined in claim 2, wherein said diaphragm adjusting means is a circular, rotatable bezel surrounding the aperture for said objective and having on a surface visible index mark means for positioning with respect to said scales of indicia.

4. A camera, as defined in claim 3, wherein said plate means is held in functional position by a cup-shaped portion, slidably fitting over said frame means of said first-named window, and wherein said plate means includes a central aperture, permitting said bezel to extend forwardly therethrough and to rotate freely therein.

5. A camera, as defined in claim 3, wherein said second-named scale of indicia for said slow film is composed of two portions located in spaced relation around said bezel, one of which portions is usable for normal daylight photography and the other of which is usable for flash photography, and wherein said index mark means on said bezel is a pair of peripherally spaced index marks, one of which is positionable with respect to said daylight scale portion and the other of which is positionable with respect to said flash scale portion.

6. A camera, as defined in claim 4, wherein said first-named window includes, extending across its face, a plurality of strips disposed in relatively different directions, arranged in a regular honeycomb pattern, and said second-named window is in the form of a pair of parallel light-admitting slots formed in said plate means and so diagonally disposed with respect to the directions of said strips as to be superimposed with substantially similar areas of said strips, irrespective of any light noncomformity in the fit of said cup-like plate portion with respect to said frame means.

7. A camera, as defined in claim 1, wherein said objective is a lens of a numerically large relative aperture.

8. A camera, as defined in claim 7, wherein said relative aperture is of the order of $f/14$.

References Cited in the file of this patent

UNITED STATES PATENTS

| | | |
|---|---|---|
| 2,672,799 | Terwilliger | Mar. 23, 1954 |
| 2,913,972 | Cade | Nov. 24, 1959 |
| 2,983,206 | Singer | May 9, 1961 |
| 2,987,977 | Bretthauer | June 13, 1961 |
| 2,999,443 | Mijauchi | Sept. 12, 1961 |
| 3,029,689 | Cech | Apr. 17, 1962 |
| 3,079,848 | Rentschler | Mar. 5, 1963 |